UNITED STATES PATENT OFFICE.

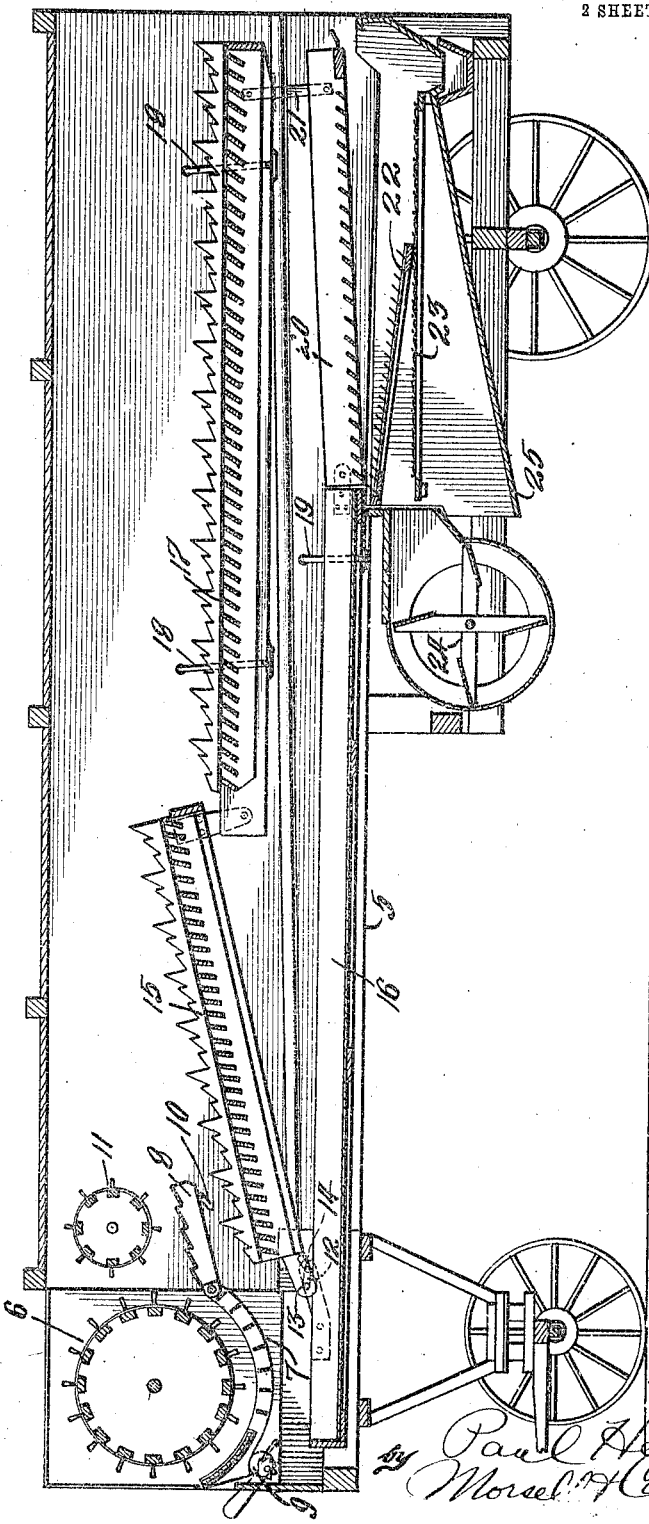

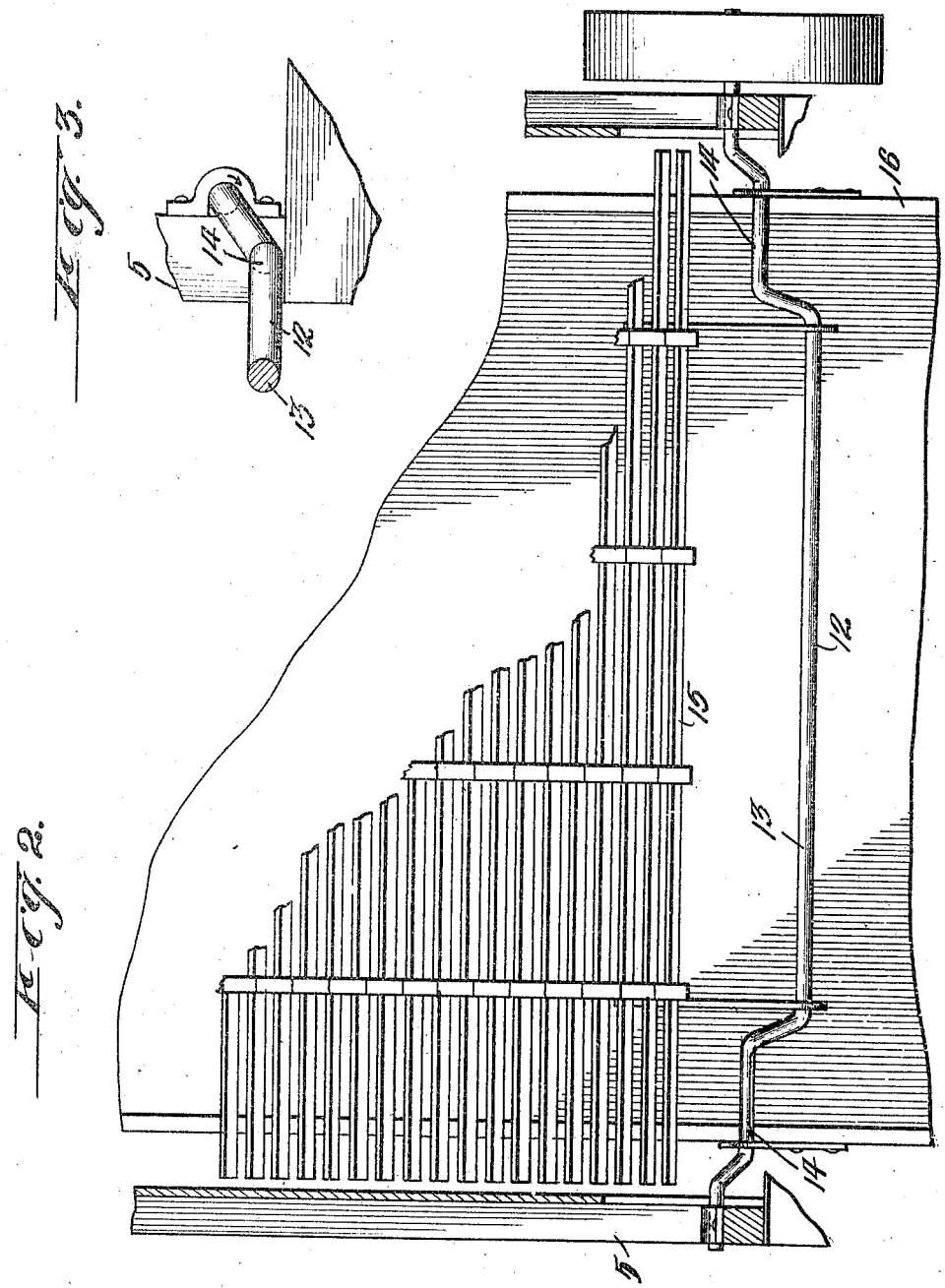

PAUL HEINZ, OF JANESVILLE, WISCONSIN.

GRAIN-SEPARATOR.

1,037,248.

Specification of Letters Patent.   Patented Sept. 3, 1912.

Application filed August 4, 1911.   Serial No. 642,305.

*To all whom it may concern:*

Be it known that I, PAUL HEINZ, a citizen of the United States, and resident of Janesville, in the county of Rock and State of Wisconsin, have invented new and useful Improvements in Grain-Separators, of which the following is a description, reference being had to the accompanying drawings, which are a part of this specification.

This invention relates to improvements in grain separators, and more particularly to the means for oscillating the straw raker and the grain bottom member of the machine.

It is one of the objects of this invention to provide a grain separator in which the straw raker and the grain bottom member are differentially oscillated by the same shaft.

A further object of the invention is to provide a grain separator in which the grain may be more thoroughly separated from the straw than heretofore and in which the operating mechanism is strong and durable and inexpensive to manufacture.

A further object of the invention is to provide a grain separator in which a straw rake and an auxiliary straw rake are provided and are operatively connected together and to the oscillatory bottom grain portion of the machine.

With the above, and other objects in view, the invention consists of the improved grain separators and its parts and combinations as set forth in the claims, and all equivalents thereof.

In the accompanying drawing in which the same reference characters indicate the same parts in all of the views Figure 1 is a longitudinal sectional view of a grain separator embodying the improved construction; Fig. 2 is a horizontal sectional detail view of the forward end of the machine; and Fig. 3 is a transverse sectional detail view of the cranked shaft and a portion of the frame.

Referring to the drawing the numeral 5 indicates the wheel mounted frame which is of the usual construction and 6 the toothed threshing cylinder in one end thereof. An adjustable concave toothed casing 7 pivotally connected to the frame and extending around the bottom portion of the cutter is provided with an adjustable rearward extension portion 8 in the form of a grate. The forward end of the casing is adjusted vertically by means of the cam member 9 and the forward end of the grate portion 8 is raised or lowered by a cranked rod 10. A beater 11 extending transversely across the machine and above the extension 8 operates in the usual manner and the extension 8 is adapted to adjust the size of the opening between the beater and the said extension.

A transverse shaft 12 mounted on the frame 5 is provided with cranked portions 13 and 14 out of alinement transversely with relation to each other and the shaft. The cranked portion 13 carries the lower end of the toothed inclined straw rake 15 and the cranked portion 14 carries the forward end of the grain bottom 16. The cranked portion 13 is of greater throw than the cranked portions 14 and is slightly in advance, in the direction of rotation, of the cranked portion 14. The upper end of the straw rake 15 is pivotally connected to the forward end of a toothed auxiliary straw rake 17 which is swingingly suspended on bails 18 extending across the frame of the machine so that the oscillation of the rake 15 will swing the auxiliary rake 17 back and forth on the bails. The rear end portion of the grain bottom 16 is suspended on a bail 19 and a chaffer 20 pivotally connected at its forward end to said rear end of the grain bottom is also supported at its opposite end by a bail 21. The frame is also provided with the usual heel riddle 22, sieve 23, fan 24 and a shoe 25 positioned below the plane of the grain bottom and at the rear end portion of the frame and which operate in the ordinary manner.

In operation the doubled crank shaft will oscillate the straw rake and the grain bottom with a differential movement and the auxiliary straw rake and the chaffer bars will also be caused to swing back and forth and the material fed to the separator will be advanced and separated by the movements of said parts.

From the foregoing description it will be seen that the grain separator is very simple in construction and operation and is well adapted for the purpose described.

What I claim as my invention is:

1. A grain separator, comprising a frame, a shaft mounted on the frame and provided with a plurality of cranked portions out of alinement transversely with relation to each other and the shaft one of which cranked portions is of greater throw than the other, a straw rake movably connected to the frame and to one of the cranked portions, and a grain bottom member movably connected to the frame and to the other cranked portion.

2. A grain separator, comprising a frame, a shaft mounted on the frame and provided with a plurality of cranked portions out of alinement transversely with relation to each other and the shaft, a straw rake pivotally connected to the frame and to one of the cranked portions, a grain bottom member pivotally connected to the frame and to the other cranked portion of the shaft, and chaffer bars pivotally connected to the frame and to the end of the grain bottom member which is connected to the frame.

3. A grain separator, comprising a frame, a shaft extending transversely across the frame and provided with a plurality of cranked portions out of alinement transversely with relation to each other and the shaft, an auxiliary straw rake movably connected to the frame, a straw rack connected to the auxiliary rack and to one of the cranked portions of the frame, and a grain bottom member movably connected to the frame and to the other cranked portions of the shaft.

4. A grain separator, comprising a frame, a shaft extending transversely across the frame and provided with a plurality of cranked portions out of alinement transversely with relation to each other and the shaft, bails extending across the frame, an auxiliary straw rack supported by the bails, a straw rake pivotally connected to the auxiliary rack and to one of the cranked portions, another bail extending across the frame, and a grain bottom member supported at one end by the last mentioned bail and connected at its other end to the other cranked portion of the shaft.

5. A grain separator, comprising a frame, a shaft extending transversely across the frame and provided with a plurality of cranked portions out of alinement transversely with relation to each other and the shaft, bails extending across the frame, an auxiliary rack supported by the bails, a straw rack pivotally connected to the auxiliary rack at one end and having its other end connected to one of the cranked portions, another bail member extending across the frame, a grain bottom member supported from the last mentioned bail at one end and having its other end connected to the other cranked portion of the shaft, and chaffer bars movably connected to the frame and to the grain bottom member.

6. A grain separator, comprising a frame, a shaft extending transversely across the frame and provided with a plurality of cranked portions out of alinement transversely with relation to each other and the shaft, one of which cranked portions is of greater throw than the other, bails extending across the frame, an auxiliary rack supported by the bails, an inclined straw rack pivotally connected to the auxiliary rack at its upper end and having its other end connected to one of the cranked portions, another bail member extending across the frame, a grain bottom member supported from the last mentioned bail at one end and having its other end connected to the other cranked portion of the shaft, and chaffer bars movably connected to the frame and to the grain bottom member.

In testimony whereof, I affix my signature, in presence of two witnesses.

PAUL HEINZ.

Witnesses:
BENJAMIN FRIDER,
J. M. HAMILTON.